Figure 1:
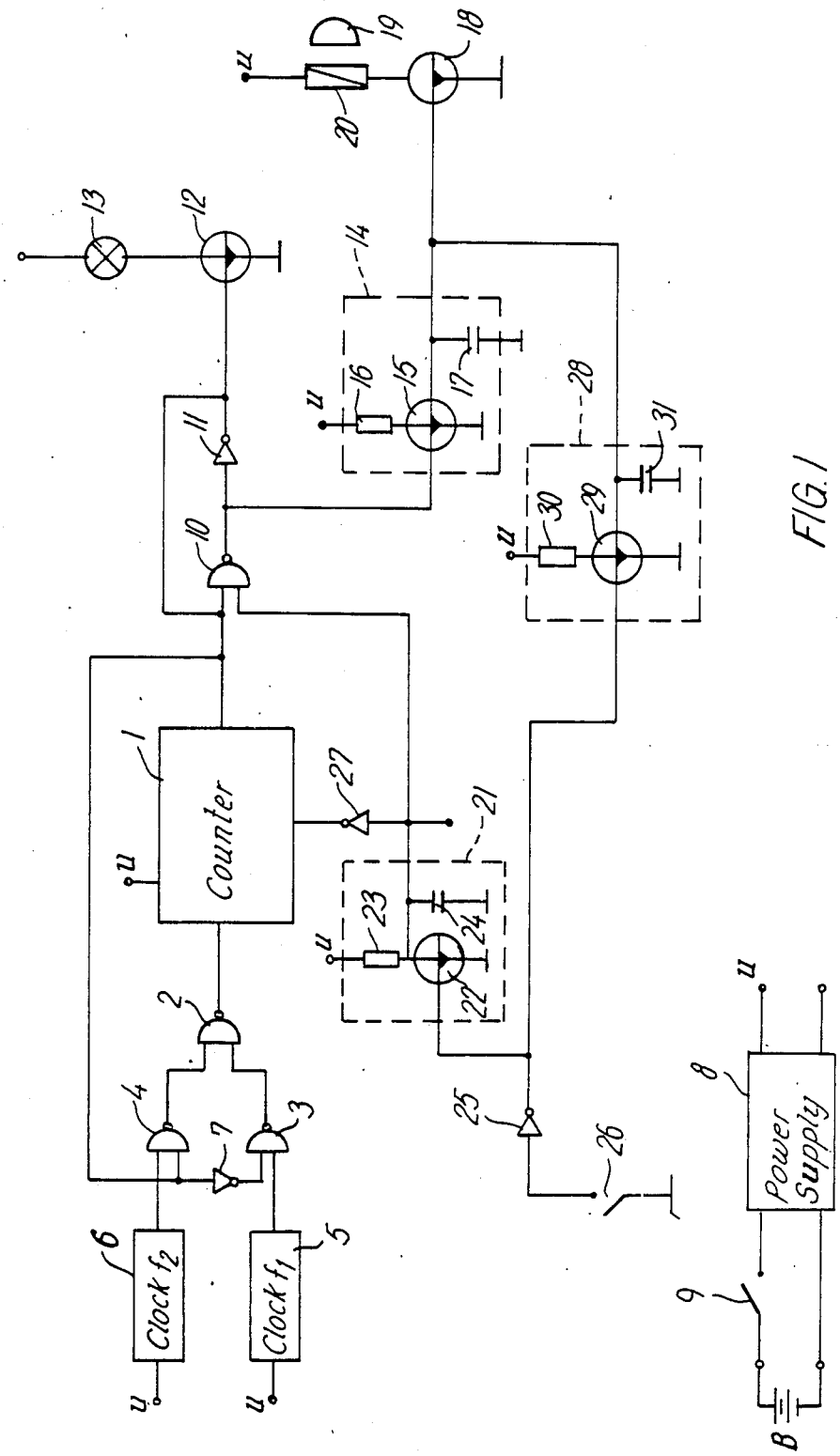

United States Patent [19]

Johansen

[11] Patent Number: 4,679,648

[45] Date of Patent: Jul. 14, 1987

[54] ALARM DEVICE FOR AUTOMOBILES AND SIMILAR VEHICLES

[76] Inventor: Kim L. Johansen, No. 12 Oldenvej, DK-3490 Kvistgaard, Denmark

[21] Appl. No.: 857,759

[22] PCT Filed: Aug. 23, 1985

[86] PCT No.: PCT/DK85/00084

§ 371 Date: Apr. 21, 1986

§ 102(e) Date: Apr. 21, 1986

[87] PCT Pub. No.: WO86/01468

PCT Pub. Date: Mar. 13, 1986

[30] Foreign Application Priority Data

Aug. 23, 1984 [DK] Denmark ............... 4036/84

[51] Int. Cl.[4] ............................................. G08B 21/00
[52] U.S. Cl. ..................................... 180/272; 340/575
[58] Field of Search ................ 180/271, 272; 340/575, 340/576

[56] References Cited

U.S. PATENT DOCUMENTS

| | | | |
|---|---|---|---|
| 2,625,594 | 1/1953 | Mathis | 180/272 |
| 3,611,344 | 10/1971 | Couper | 180/272 |
| 3,654,599 | 4/1972 | Sepper | 340/52 |
| 3,922,665 | 11/1975 | Curry et al. | 180/272 |
| 4,005,398 | 1/1977 | Inoue et al. | 340/279 |
| 4,359,725 | 11/1982 | Balogh et al. | 180/272 |

FOREIGN PATENT DOCUMENTS

| | | |
|---|---|---|
| 337019 | 6/1977 | Austria . |
| 0030021 | 11/1980 | European Pat. Off. . |
| 2042853 | 3/1972 | Fed. Rep. of Germany . |
| 2142574 | 2/1973 | Fed. Rep. of Germany . |
| 2516675 | 4/1975 | Fed. Rep. of Germany . |
| 2450270 | 4/1976 | Fed. Rep. of Germany . |
| 2546345 | 4/1977 | Fed. Rep. of Germany . |
| 8304267-1 | 8/1983 | Sweden . |

Primary Examiner—John J. Love
Assistant Examiner—Ross Weaver
Attorney, Agent, or Firm—Browdy and Neimark

[57] ABSTRACT

The alarm device comprises a pulse timer which at varying, non-predictable time intervals supplies activation signals for ignition of a warning lamp (13) and activation of an acoustic alarm generator (19), if the driver has not within a predetermined time interval after ignition of the warning light (13) operated a selectively operable resetting contact (26). The pulse time is constituted by a counter (1) for which the frequency of the supplied counting pulses is switched over from a comparatively low value ($f_1$) to a substantially higher frequency ($f_2$) upon supplying the activation signal for ignition of the warning lamp (13). By operating the resetting contact (26) the counter (1) is stopped in the occupied counting position for a predetermined second time interval. At the expiry of said time interval the signal connection from the counter to the warning lamp is re-established and the counter (1) counts further from the occupied counting position with the comparatively low count pulse frequency ($f_1$). In order to prevent the alarm from being inactivated by continuous operation of the resetting button (26) a timing circuit (28) is inserted between said contact and the acoustic alarm generator (19), said timing circuit supplying activation signals to the alarm generator if operation of the resetting contact (26) has not ceased within a third predetermined time interval.

4 Claims, 2 Drawing Figures

ALARM DEVICE FOR AUTOMOBILES AND SIMILAR VEHICLES

This invention relates to an alarm device for automobiles and similar vehicles, comprising a pulse timer connected to the battery of the vehicle through a contact activated upon forward driving in a high gear, said pulse timer being further connected to a warning lamp and through a first timing circuit to an acoustic alarm generator for operation of the latter after a first predetermined time interval following activation of the warning lamp, a switch being connected between the pulse timer on one hand and the warning lamp and said timing circuit, respectively, on the other hand, and being controlled by a contact selectively operable by the driver to interrupt the signal connection between the pulse timer and the warning lamp and the first timing circuit, respectively.

When motoring for a long time, in particular through relatively monotonous road stretches failing alertness or beginning bluntness or drowsiness of the driver frequently cause dangerous traffic situations and such conditions particularly occurring with long distance truck drivers and professional vehicle operators cause or are a contributory cause of a number of traffic accidents. The same applies in case of sudden illness. Therefore, a pronounced need exists for precautionary measures capable of eliminating the risk of such conditions without, incidentally, jeopardizing road safety.

So-called dead man's devices are generally known from railbound means of transport, in particular trains. Such devices include ordinarily one or more electrical contact systems to be kept continuously activated when driving and which on deactivation, e.g. caused by sudden illness striking the driver, effects an actual emergency procedure, most frequently in the form of prompt stopping.

Such active, automatically operating precautionary measures which have also been proposed for introduction in motor-cars or similar vehicles are for traffic safety reasons not appropriate in highway traffic.

An alarm device of the above mentioned type is known from U.S. Pat. No. 3,611,344 according to which the pulse timer activates the warning lamp at determined time intervals, e.g. every 4 minutes. If, before the expiry of said first time interval, the driver has not switched off the warning light by a reset button, the acoustic alarm is activated. In said device the operator thus knows beforehand when to activate the reset button in order to avoid the acoustic signal which makes the prior device less appropriate to prevent inattention of the driver caused by beginning drowsiness. The object of the invention is to provide a simply operating and inexpensive safety device remedying said deficiency of the prior device through activation of the warning light at varying non-predictable time intervals.

This is obtained according to the invention in that the pulse timer is a counter which in a closed condition of said switch supplies its activation signal in a predetermined final counting position, that said counter from a first clock generator or from a second clock generator, respectively, which are connected to the counter over a logic switching circuit either with a first counting pulse sequence in a first counting condition lasting until occupying said final counting condition or with a second counting pulse sequence in a second counting condition initiated by activation of the logic switching circuit in response to the counter generating said activation signal, said second counting pulse sequence having substantially higher frequency than said first sequence, a second timing circuit being connected to said selectively operable contact for supplying a stop signal to the counter during a predetermined second time interval following the drive's activation of said contact and supplying at the expiry of said second time interval a control signal to said switch for re-establishing the signal connection between the counter and the warning lamp and the first timing circuit, respectively.

Starting from a situation where the alarm device has just been deactivated by the driver's operation of the selectively operable contact, the counter will thus in the first counting condition receive the first counting pulse sequence having a frequency e.g. of 1 Hz until attaining the final counting position. Upon supplying the activation signal for ignition of the warning light in this counting position switching is simultaneously effected to the second counting condition, in which the counter receives the second counting pulse sequence having a frequency e.g. of about 15 to 20 Hz. When operating the selectively operable contact the counter is stopped in the counting position actual at the contact operation time and at the same time the signal connection to the warning lamp and the first timing circuit is interrupted, thereby effecting switching-back to the first counting condition, in which the first clock generator is connected to the counter. At the expiry of said second time interval the signal connection is re-established and the interruption of the counter is neutralized so that the counter now counts further with the first counting pulse sequence from the position in which it was stopped till the final counting position is attained again.

The counter being for instance a ten-position counter and said second time interval having for instance a duration of 4 seconds, the time intervals between successive ignitions of the warning light will thus vary in a quite unexpected manner between about 4 and about 14 seconds.

According to a further development of the invention a third timing circuit may be connected to said selectively actuatable contact, said timing circuit being directly connected to the acoustic alarm generator for activation thereof, if operation of the selectively operable contact has not ceased within a third predetermined time interval.

In contradiction to the above mentioned prior device according to U.S. Pat. No. 3,611,344 it is thereby made impossible for the driver to inactivate the alarm device by incessant operation of the selectively operable contact.

Figure 2:
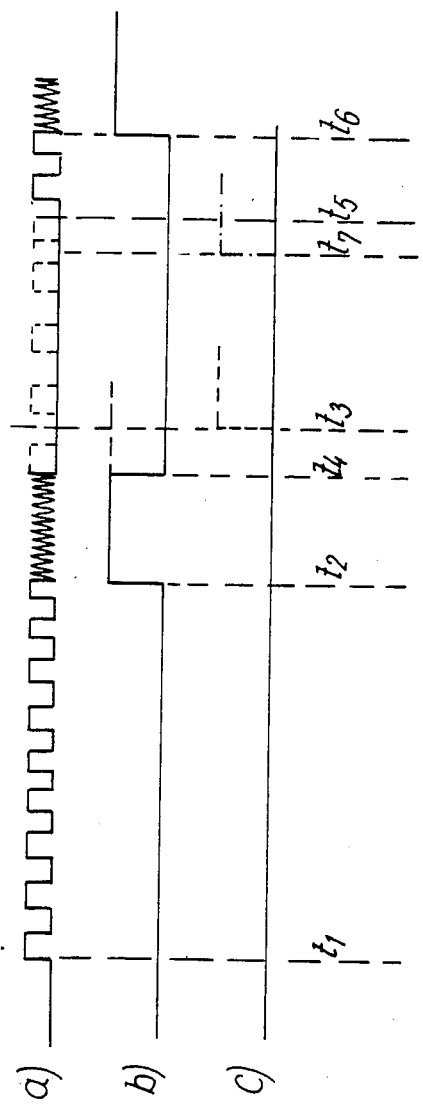

The invention will be explained in more detail in the following with reference to the schematical drawings, in which FIG. 1 is a block diagram of an embodiment of an alarm device according to the invention, and FIG. 2 is a signal diagram explaining the mode of operation of the alarm device.

In the illustrated embodiment the pulse timer of the alarm device is constituted by a counter 1 with for instance ten counting positions. The counting pulse input of the counter 1 is connected to the output of a NAND-gate 2 whose two inputs are connected to the output of respective NAND-gates 3 and 4, each having two inputs one of which is connected to the output of a clock generator 5 and 6, resp., while the second input of the two NAND-gates 3 and 4 is connected through an inverter 7 and directly to the output of the counter 1, respectively. The clock generators 5 and 6 are driven at a supply voltage U delivered by a power supply 8 connected to the battery B of the car through a contact 9 mounted in connection with the gear box of the vehicle and activated automatically upon forward driving in a high gear.

A counting pulse sequence having a comparatively low frequency $f_1$, e.g. 1 Hz, is supplied from the clock generator, while a counting pulse sequence having a frequency $f_2$ constituting a substantial multiple of the frequency $f_1$, e.g. 15 to 20 Hz, is supplied from the clock generator 6.

The output of the counter 1 is connected to the one input of a NAND-gate 10 controlling a transistor 12 through an inverter 11, said transistor activating the ignition and switching-off of a warning lamp 13.

The output of the NAND-gate 10 is further connected to the input of a first timing circuit 14 including a transistor 15 in connection with a RC-circuit comprising a resistor 16 and a capacitor 17. The output of the timing circuit 14 is connected to a transistor 18 controlling activation and deactivation of an acoustic alarm device 19, for instance a buzzer, through a relay 20.

The other input of the NAND-gate 10 is connected to the output from a second timing circuit 21 having a transistor 22 in connection with a RC-circuit comprising a resistor 23 and a capacitor 24.

The inputs to the control circuit 21 are connected through an inverter 25 to a contact 26 selectively operable by the driver to cancel the acoustic alarm function. The contact 26 may be a mechanical foot switch or a switch mounted on the steering column, for instance in the form of a so-called "easy touch"-button.

The output of the timing circuit 21 is in addition to being connected to said input of the NAND-gate 10 also connected through an inverter 27 to a stop signal input for the counter 1.

In order to prevent attempts to inactivate the alarm device by incessant operation of the contact 26 a third timing circuit 28 may further, as illustrated in FIG. 1, be connected to the output of the inverter 25, said third circuit comprising a transistor 29 in connection with a RC-circuit comprising a resistor 30 and a capacitor 31 and having an output connected directly to the transistor 18 controlling activation and deactivation of the acoustic alarm generator 19.

The mode of operation of the alarm device will be explained in the following by means of the signal diagrams in FIG. 2, which at a show the function of the counter 1, at b the ignition and switching-off of the warning light 13, and at c the activation and deactivation of the acoustic alarm generator 19.

At the time $t_1$ the alarm device is started with automatic activation of the contact 9 mounted on the gear box, thereby connecting the supply voltage U to the counter 1, the clock generators 5 and 6, the timing circuits 14, 21 and 28, the warning lamp 13 and the activation relay 20 of the acoustic alarm generator 19. As the signal at the input of the NAND-gate 3 connected to the inverter 7 will, in this condition, have the binary value 1 and the signal at the output of the NAND-gate 2 will likewise have the binary value 1, the pulse sequence with the frequency $f_1$ from the clock generator 5 will be supplied as counting pulses to the counter 1.

When the counter 1 which as mentioned may for instance be a ten-position counter attains its final counting position, it supplies at its output an activation signal which is applied to the NAND-gate 10 and at the same time counting restarts. Since, in this condition, the signal at the input of the NAND-gate 10 connected to the timing circuit 21 has the binary value 1, the counter activation signal causes that a holding function be established via a feed-back circuit from the output of the inverter 11 to the input of the NAND-gate 10 connected to the counter 1, so that the signal at said input is kept at the binary value 1. When the counter activation pulse occurs the transistor 12 connected to the inverter 11 will then be switched into its conductive state at the time $t_2$, thereby igniting the warning lamp 13.

When the counter activation signal is supplied and the said holding function is established a switching-over of the NAND-gates 3 and 4 will further be effected so that the counter 1 now receives the pulse sequence as counting pulses having the considerably higher frequency $f_2$ from the clock generator 6.

When the counter activation signal results in a signal having the logical value 0 at the output of the NAND-gate 10, the transistor 15 in the timing circuit 14 will be blocked, whereby charging of the capacitor 17 will be started. If the signal condition at the input of the timing circuit 14 has not changed within a first predetermined time interval which may e.g. be three seconds, the charging of the capacitor 17 at the time $t_3$ will result in the transistor 18 being switched into conductive condition, thereby actuating the acoustic alarm generator 19 across the relay 20, as illustrated in dashed lines in FIG. 2C.

When the driver operates the selectively operable contact 26 at the time $t_4$ the transistor 22 of the timing circuit 21 is switched into conductive condition, thereby discharging the capacitor 24, and the signal at the output of the timing circuit 21 assumes the binary value 0. Thereby, the signal at the output of the NAND-gate 10 will assume the binary value 1, thereby cancelling the first mentioned holding function, and the transistor 12 will be blocked to extinguish the warning lamp 13. At the same time the transistor 15 is switched into conductive condition to discharge the capacitor 17. The switching-over of the signal at the output of the timing circuit 21 from the binary value 1 to the binary value 0 further causes a signal to be supplied to the counter 1 through the inverter 27, thereby disrupting the counting function.

At the cessation of the holding function of the NAND-gate 10 the NAND-gates 3 and 4 are again switched over to the start condition, thereby supplying the timing pulse sequence having the frequency $f_1$ from the clock-generator 5 to the counter 1.

As soon as the driver's operation of the contact 26 ceases the transistor 22 will block the timing circuit 21, thereby effecting beginning charging of the capacitor 24. After a predetermined second time interval which may last for instance four seconds, the signal at the output of the timing circuit 21 thereby changes again at the time $t_5$ from the binary value 0 to the binary value 1.

By this change of the signal condition of the NAND-gate 10 the alarm device is again ready to effect the alarm function. The stop signal of the counter 1 supplied through the inverter 27 ceases simultaneously, and the counter 1 now counts further at the frequency $f_1$ from the counting position it occupied on operation of the switch 26.

When the counter 1 again reaches the final counting position a new counter activation signal is supplied at the time $t_6$. Due to the said frequency change-over of the counting pulses the activation signals from the counter 1 for ignition of the warning lamp 13 will thus be generated at time intervals whose length vary between a duration corresponding to the duration of the second time interval associated with the timing circuit 21 and a duration corresponding to said time interval plus the total duration of the counting cycle of the counter 1. With the counter 1 implemented as a 10-position counter, a counting frequency $f_1$ of 1 Hz and a duration of said second time interval of 4 seconds the activation pulses will thus be generated at time intervals varying between about 4 and about 14 seconds, and this makes it impossible for the driver to calculate beforehand the time of occurrence of the following activation signal.

In order to avoid that the driver inactivates the alarm device by continuously operating the contact 26 which would cause the signal at the output of the timing circuit 21 be kept at the binary value 0, the output of the inverter 25 is as mentioned connected to a third timing circuit 28 operating substantially in the same manner as the timing circuit 14, in that upon operation of the contact 26 the transistor 29 will be blocked to initiate charging of the capacitor 31. If the operation of the contact has not ceased within a third time interval determined by the time constant of the RC-circuit 30, a signal is immediately supplied by the timing circuit 28 switching the transistor 18 in its conductive condition and thereby activating the acoustic alarm generator 19 as shown in dot-and-dash lines in FIG. 2C at the time $t_7$.

The duration of said third time interval may be for instance 4 seconds.

I claim:

1. An alarm device for automobiles and similar vehicles, comprising a pulse timer (1) connected to the battery (B) of the vehicle through a contact (9) activated upon forward driving in a high gear, said pulse timer being further connected to a warning lamp (13) and through a first timing circuit (14) to an acoustic alarm generator (19) for operation of the latter after a first predetermined time interval following activation of the warning lamp (13), a switch (10) being connected between the pulse timer (1) on one hand and the warning lamp (13) and said timing circuit (14), respectively, on the other hand, and being controlled by a contact (26) selectively operable by the driver to interrupt the signal connection between the pulse timer (1) and the warning lamp (13) and the first timing circuit (14), respectively, characterized in that the pulse timer is a counter (1) which in a closed condition of said switch (10) supplies its activation signal in a predetermined final counting position, that said counter (1) from a first clock generator (5) or from a second clock generator (6), respectively, which are connected to the counter (1) over a logic switching circuit (2 to 4) either with a first counting pulse sequence in a first counting condition lasting until occupying said final counting condition or with a second counting pulse sequence in a second counting condition initiated by activation of the logic switching circuit in response to the counter (1) generating said activation signal, said second counting pulse sequence having substantially higher frequency ($f_2$) than said first sequence ($f_1$), a second timing circuit (21) being connected to said selectively operable contact (26) for supplying a stop signal to the counter (1) during a predetermined second time interval following the driver's activation of said contact (26) and supplying at the expiry of said second time interval a control signal to said switch (10) for re-establishing the signal connection between the counter (1) and the warning lamp (13) and the first timing circuit (14), respectively.

2. An alarm device as claimed in claim 1, characterized in that a third timing circuit (28) is further connected to the selectively operable contact (26), said timing circuit (28) being directly connected to the acoustic alarm generator (19) for activation thereof, if operation of the selectively operable contact (26) has not ceased within a third predetermined time interval.

3. An alarm device as claimed in claim 1, characterized in that said logic switching circuit (2 to 4) is actuated to connect said first timing oscillator (5) to said counter (1) by actuation of said switch (10) for establishing the signal connection between the counter (1) and the warning lamp (13) and said first timing circuit (14), respectively.

4. An alarm device as claimed in claim 2, characterized in that said logic switching circuit (2 to 4) is actuated to connect said first timing oscillator (5) to said counter (1) by actuation of said switch (10) for establishing the signal connection between the counter (1) and the warning lamp (13) and said first timing circuit (14), respectively.

* * * * *